United States Patent [19]
Weitekamp

[11] Patent Number: 4,978,080
[45] Date of Patent: Dec. 18, 1990

[54] ROTOR INDEXING SYSTEM
[75] Inventor: Maurice E. Weitekamp, Fox Point, Wis.
[73] Assignee: Weimer Bearing & Transmission, Inc., Menomonee Falls, Wis.
[21] Appl. No.: 466,519
[22] Filed: Jan. 17, 1990

Related U.S. Application Data
[63] Continuation-in-part of Ser. No. 324,191, Mar. 16, 1989, abandoned.
[51] Int. Cl.⁵ .............................................. B02C 13/30
[52] U.S. Cl. .............................. 241/101.2; 241/189 R
[58] Field of Search ................ 74/824, 813 L; 192/94, 192/67 R, 17 R, 12 R, 12 D, 108, ,995; 241/101.2, 189 R, 197, 194, 185 R

[56] References Cited
U.S. PATENT DOCUMENTS

| 431,066 | 7/1890 | Leverich . |
| 1,716,594 | 6/1929 | Metcalf . |
| 1,966,314 | 7/1934 | Schicht . |
| 2,504,018 | 4/1950 | Gibson et al. . |
| 2,858,082 | 10/1958 | Berling . |
| 3,160,351 | 12/1964 | Shelton, Jr. . |
| 4,002,301 | 1/1977 | Shurtleff . |
| 4,074,946 | 2/1978 | Swearingen . |
| 4,087,084 | 5/1978 | Meyers . |
| 4,136,833 | 1/1979 | Knight . |
| 4,215,962 | 8/1980 | Kreucher . |
| 4,223,775 | 9/1980 | Lloyd . |

FOREIGN PATENT DOCUMENTS
142032 4/1920 United Kingdom .

Primary Examiner—Mark Rosenbaum
Attorney, Agent, or Firm—Andrus, Sceales, Starke & Sawall

[57] ABSTRACT

A rotor indexing system is provided for indexing the massive high inertia hammer-carrying rotor (5) of a hammer mill (1) or the like. The rotor is mounted on a large main shaft (2) which is rotatably driven by a main drive motor (4). A motively powered indexing apparatus is disposed at and in axial alignment with the rear end of the main shaft, and includes a power transmission or coupling (12) comprising a first coupling member (14,56) coaxially mounted to and for rotation with a rotatable output member (the rear end of the main shaft in this embodiment) and fixed against longitudinal axial movement; as well as a second coupling member (15,58) normally spaced from the first coupling member and mounted for longitudinal movement into and out of full coupling power-transmitting engagement with the first coupling member. The second coupling member is mounted to a prime mover or rotor indexing drive assembly (7) including a motive means (9b) of relatively high speed and low torque connected through a speed reducer (10) having an extremely low speed high torque output shaft (11), to which the second coupling member is connected. A normally engaged brake (9a) is connected to the assembly motor input shaft, and is arranged to disengage when the assembly motor is actuated. The arrangement may be such that the entire rotor indexing drive assembly is movable and carries the second coupling member into or out of selective engagement with the first coupling member.

10 Claims, 4 Drawing Sheets

ROTOR INDEXING SYSTEM

This is a continuation-in-part of my application Ser. No. 07/324,191 filed Mar. 16, 1989 and having the same title.

BACKGROUND AND SUMMARY OF THE INVENTION

This invention relates to the indexing or positioning of large rotating devices or rotors, particularly rotatable members having large inertia masses, such as in rotating hammer mills or shredders.

Large hammer or crusher mills are used extensively in the reduction of friable and non-friable materials. Such mills require frequent replacement of hammer impact surfaces used in the shredding and reduction process, as is disclosed for example in U.S. Pat. No. 4,136,833 to Knight. These hammer mills, particularly those designed for reduction of non-friable materials such as scrap metal or automobiles, are quite massive, and the positioning or indexing of the mill rotors for replacement of the worn hammers is a difficult and time consuming operation.

Heretofore, methods for indexing the hammer mill rotor to position hammers for replacement has been accomplished by substantially manual methods. For example, the rotor was slowly moved into the desired position by using a long heavy crowbar, sets of "come-alongs", cranes, hoists, etc. These manual methods of indexing rotors for hammer replacement are laborious, somewhat dangerous, and they add significantly to the down time of the mill.

Consequently, there has existed a need for safely, rapidly and accurately indexing or positioning these high inertia massive rotors to facilitate hammer or other impacting surface replacement or to perform routine maintenance, while avoiding problems such as recoil, rocking, telegraphing or destructive oscillations upon stopping.

In accordance with the various aspects of the invention, a rotor indexing system is provided for indexing the massive high inertia hammer-carrying rotor of a hammer mill or the like, and wherein the rotor is mounted on a large main shaft which is rotatably driven by a main drive motor. A motively powered indexing apparatus is disposed at and in axial alignment with the rear end of the main shaft, and includes a power transmission or coupling comprising a first coupling member coaxially mounted to and for rotation with a rotatable output member (such as the main mill or main motor shaft) and fixed against longitudinal axial movement; as well as a second coupling member normally spaced from the first coupling member and mounted for longitudinal movement into and out of full coupling power-transmitting engagement with the first coupling member.

The second coupling member is mounted to a prime mover or rotor indexing drive assembly including a motive means of relatively high speed and low torque connected through a speed reducer having an extremely low speed high torque output shaft, to which the second coupling member is connected. A normally engaged brake is connected to the assembly motor shaft, and is arranged to disengage when the assembly motor is actuated.

The arrangement may be such that the entire rotor indexing drive assembly is movable and carries the second coupling member into or out of selective engagement with the first coupling member. Alternately, the drive assembly is fixed, and the second coupling member is slidable on the assembly and into or out of engagement with the first coupling member.

In one embodiment, the coupling members comprise a pair of generally co-axial coupling bodies having circumferentially spaced specially bevelled jaws and substantially parallel working surfaces which, when the jaws mate, enhance the ability to handle extremely high torque loads. Furthermore, a special clearance is provided between the jaws of the mating coupling bodies to facilitate engagement. In addition, the first coupling body is mounted to a pilot shaft secured for rotation with the aforementioned rotor shaft. The pilot shaft is adapted to extend through and form the core of the first coupling body and snug-fittingly telescope into a recess in the second jaw upon coupling engagement of the two members. The pilot shaft is provided with a tapered leading edge to correct for any axial misalignment between the members, and a slightly smaller diameter than that of the mating recess in the jaws of the second coupling body.

In another embodiment, the coupling members comprise a pair of engagable gears mounted on spaced parallel axes.

BRIEF DESCRIPTION OF THE DRAWINGS

The accompanying drawings illustrate the best modes presently contemplated by the inventor for carrying out the invention.

DESCRIPTION OF THE PREFERRED EMBODIMENT

Figure 1:
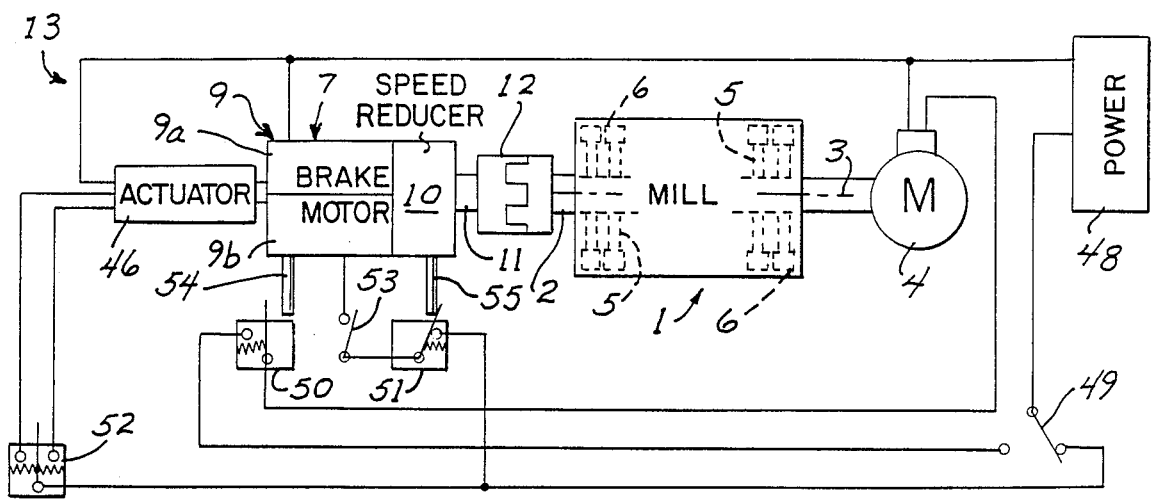
FIG. 1 is a schematic side view of an arrangement including a hammer mill or the like, and incorporating one embodiment of a rotor indexing system.
Figure 2:
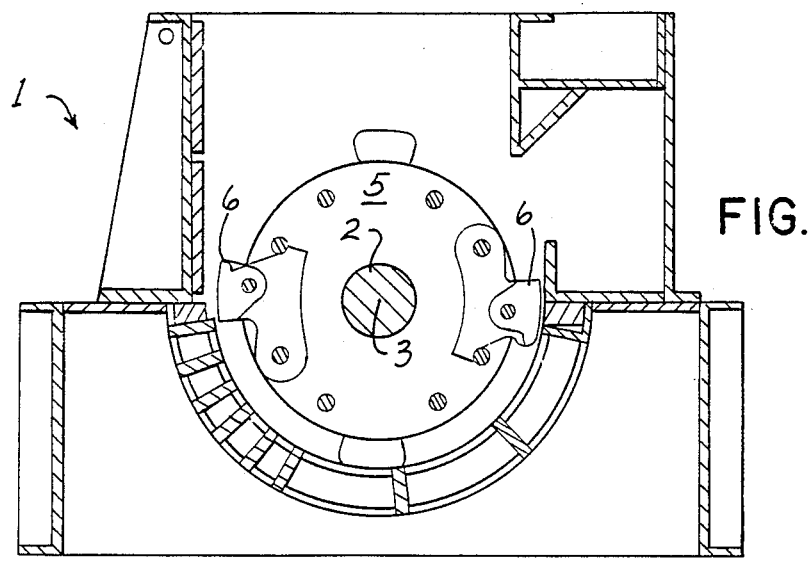
FIG. 2 is a schematic cross sectional view of the hammer mill and showing the shaft-mounted rotor and hammers.

Referring initially to FIGS. 1 and 2, the various aspects of the invention are adapted for utilization in association with a hammer mill 1 or the like, which includes a large, heavy main shaft 2 adapted to rotate on a longitudinal mill axis 3, and which is rotatably driven by a suitable motive means such as a diesel engine or, as shown, a motor 4, of very high power, such as 1,000 to 10,000 horsepower. Shaft 2 carries a massive heavy rotor 5 which has a plurality of hammers 6 secured thereto to provide the surfaces for crushing automobiles or the like.

Figure 3:
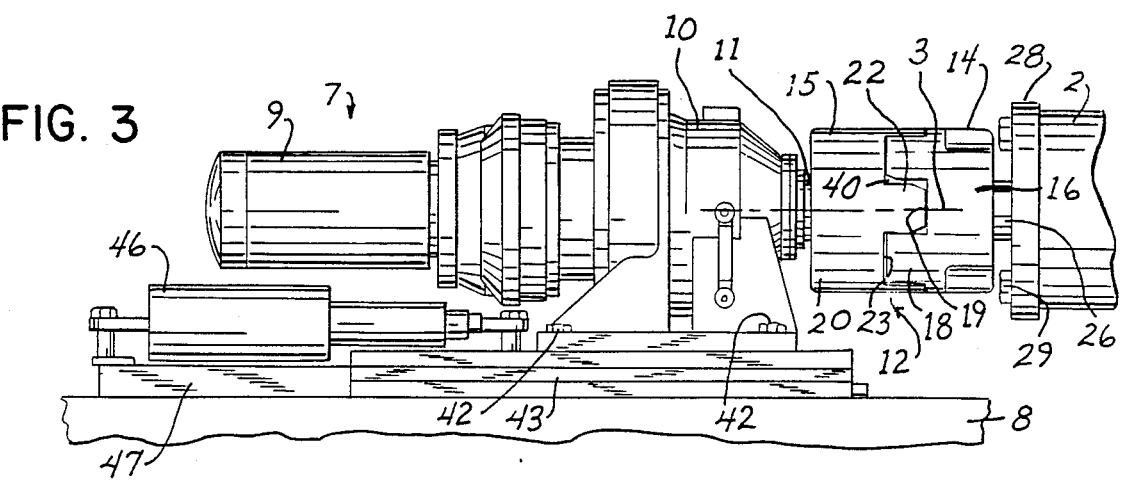
FIG. 3 is a side elevational view of the rotor indexing device with the rotor indexing drive assembly mounted for movement parallel to the hammer mill rotor shaft axis.

One end of main shaft 2 of mill 1 extends outwardly from the latter toward a rotor indexing drive assembly 7 mounted to the machine frame 8 (FIG. 3). Drive assembly 7 generally includes a brake-motor assembly 9 having a brake 9a and a reversible indexing motor 9b, with the latter having a rotary output which feeds through a speed reducer 10 having an output shaft 11. A power transmission means or coupling 12 of relatively high torque capacity is disposed between output shaft 11 and mill shaft 2 and is normally disengaged, but is selectively engaged when it is desired to index rotor 5, as will be described more fully hereinafter. The control system 13 schematically shown in FIG. 1 is illustrated by way of example only, and will also be described more fully hereinafter.

The rotary parts of mill 1 weigh many tons, and the various manual systems briefly mentioned heretofore have not been satisfactory. It is therefore contemplated in accordance with the aspects of the invention that rotor indexing drive assembly 7 makes it possible to suitably index rotor 5 with an arrangement that is accurate, small and yet ultimately powerful enough to accomplish the desired task.

For this purpose, indexing motor 9b is contemplated as being relatively low in torque (such as a torque of about 1 to 3 ft. lbs.) and having a high speed output, such as 1750 RPM. This output is fed to speed reducer 10, which is contemplated as providing a major gear reduction, such as 3,000 to 1. A cycloidal type gear reducer has been found to work exceedingly well, although other types may be utilized without departing from the spirit of the invention. With the input of such a speed reducer being 1750 RPM, its output at shaft 11 can be at the lower speed of approximately ½ RPM with tremendous torque (such as 3,000 to 10,000 ft. lbs.) which is sufficient to rotate the mill shaft 2.

For purposes of rotatably indexing mill shaft 2, a coupling 12 is disposed between speed reducer output shaft 11 and mill shaft 2. For this purpose, a first coupling member is coaxially mounted to and for rotation with the rear end of shaft 2, while a second coupling member is normally in disengagement from and spaced rearwardly from the first member and mounted for longitudinal movement into and out of coupling engagement with the latter.

In the embodiment of FIGS. 1-7, the first and second members comprise matable coupling bodies 14 and 15 respectively with first coupling body 14 including an annular base 16 having a central bore 17 and with the outer base portion forming a plurality of longitudinally extending circumferentially spaced jaws 18 joined at their bases by transverse flat surfaces 19 formed in base 16. Likewise, second coupling body 15 includes an annular base 20 having a central bore 21 and with the outer base portion forming a similar plurality of longitudinally extending circumferentially spaced jaws 22 joined at their bases by transverse flat surfaces 23 formed in base 20.

The curved inner surfaces of jaw 18 of coupling body 14 define a longitudinally inwardly extending recess or cavity 24 which communicates with bore 17. Likewise, the curved inner surfaces of jaw 22 of coupling body 15 define a similar longitudinally extending recess or cavity 25 which communicates with bore 21.

Figure 6:
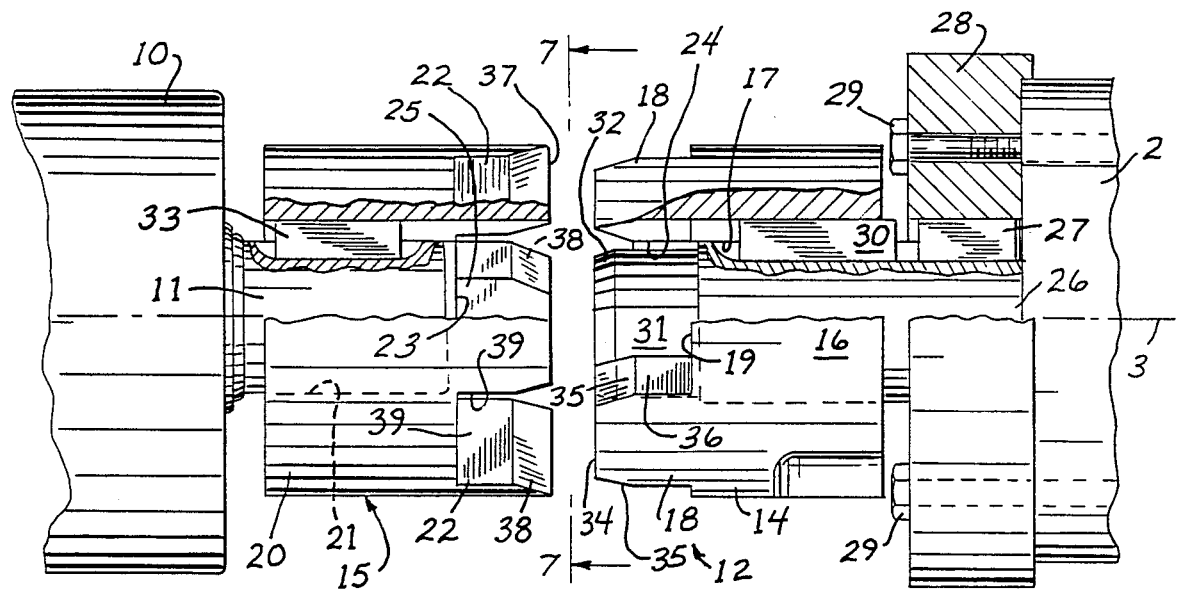
FIG. 6 is an enlarged showing, with parts broken away and in section, of the jaw coupling in disengaged position.
Figure 7:
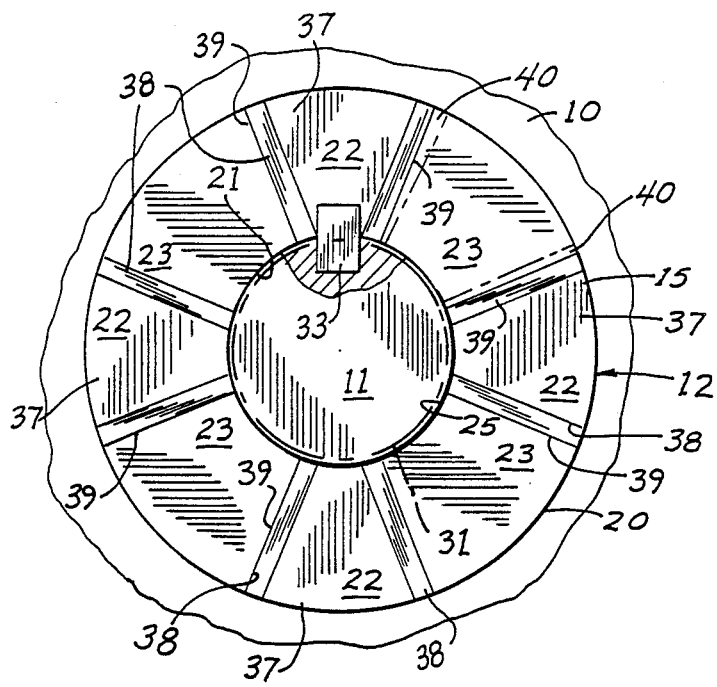
FIG. 7 is a transverse sectional view of the second or outer jaw, taken on line 7—7 of FIG. 6.

Coupling body 14 is mounted for rotation with mill shaft 2 in a manner so that the body is fixed against longitudinal axial movement. For this purpose, and as best seen in FIG. 6, a rearwardly extending stub or pilot shaft 26 is suitably coaxially secured at its forward end to the rear end of mill shaft 2 in any manner suitable to transmit upwards of 15,000 ft. lbs. of braking or recoiling torque. Pilot shaft 26 is fixedly mounted by welding and as by a key 27, within an annular flange 28 mounted on mill shaft 2, as by cap screws 29. Pilot shaft 26 extends rearwardly from flange 28 and serves to fixedly mount coupling body 14, as by a key 30. The outer end portion 31 of pilot shaft 26, corresponding generally to the depth of jaws 18, is slightly reduced in diameter; and the terminus leading edge of pilot shaft 26 is provided with a taper 32, for purposes to be described.

Coupling body 15 is mounted for rotation with speed reducer output shaft 11 and is adapted for coupling engagement with coupling body 14 in a manner to be described hereinafter. In the embodiment of FIGS. 1-7, coupling body 15 is fixedly mounted to shaft 11, as by a key 33 and suitable set screws.

The coupling jaws are of a special configuration for purposes to be described. As to coupling body 14, and referring especially to FIG. 6, jaws 18 are formed with flat outer ends 34 which are parallel to flat surfaces 19 and 23, the ends 34 merging at each side of each jaw into a bevelled surface 35 preferably of about 35°-45°, with each surface 35 merging into a longitudinal flat side or working surface 36. Coupling body 15 is similarly constructed with flat outer jaw ends 37 which are parallel to flat surfaces 19 and 23, these ends merging at each side of each jaw into a bevelled surface 38 of the same incline as surfaces 35, with each surface 38 merging into a longitudinal flat side or working surface 39.

As coupling bodies 14 and 15 and respective jaws 18 and 22 are brought into engaging relationship in a manner to be described, pilot shaft 26, which terminates generally in a plane parallel to tooth ends 34, is telescoped into cavity 25 of coupling body 15 until the jaw ends of the respective coupling bodies engage the flat surfaces 19,23 of the opposite coupling. The jaws of one coupling body enter into telescoping relation and between the jaws of the other coupling body.

The construction is such as to provide suitable rotational and co-axial alignment between bodies 14 and 15 as they are coupled together. This alignment is to evenly distribute the very substantial load in compression on the jaws' working surfaces 36 and 39.

As to rotational alignment, if the jaws of the opposed bodies are slightly out of alignment, as the opposing jaws 18 and 22 come together, the bevelled surfaces 35 and 38 will be caused to slide by each other in a wedging action, causing speed reducer output shaft 11 and its accompanying coupling body 15 to rotate to align the bodies so that their respective jaws can telescope. It will be noted that coupling body 14, being connected to the massive hammer mill rotor structure, need not rotate, with body 15 making all the rotational adjustment to allow total coupling of the two coupling body sets.

As to axial alignment, as pilot shaft 26, which extends through coupling body 14, is caused to enter cavity 25 of coupling body 15, the tapered terminus end 32 of pilot shaft 26 will penetrate jaws 22, thus forcing the jaws into coaxial alignment. This arrangement may be especially useful in the event of mechanical distortion of the hammer mill parts, due to temperature variations or the like. This distortion needs to be dealt with, since it is important that the working surfaces 36,39 of adjacent mating jaws be in substantially exact parallelism (generally up to a possible tolerance of about 1/5,000 inch) in view of the very high torque involved in indexing rotor 5. Otherwise, breakage of the jaws during indexing may be encountered.

In addition, to provide sufficient clearance for aligning the jaws, a special tolerance is built into the mating working surfaces 36,39 of engaging jaws 18,22. The tolerance may be of the order of 70,000th inch for a single jaw, and the clearance is shown in exaggerated form at 40 in FIGS. 3 and 7. This feature may also assist in overcoming binding lock-up, excess spacing or other problems resulting from mill bearing pedestal growth due to extreme temperature variations as typically experienced in hammer mill operations.

As can be seen above, one of the inventive aspects compensates for mill shaft temperature growth differentials. In the case of the embodiment of FIGS. 1–7, engagement is facilitated by using the special coupling jaw design with bevelled leading edges on the jaws. Conventional air or hydraulically operated friction clutches are not practical in the environment of high amplitude vibration and excess shaft growth. Traditional use of conventional jaw clutch couplings wherein one shaft rotates inside the bore of the opposite coupling member under all mill operating conditions does not present a viable solution either. Large mill shafts over 150 inches in length will "grow" or expand in length by as much as $\frac{1}{8}$" from cold to hot operating conditions. The amplitude of vibration of an automobile mill shredder is great enough to destroy conventional clutches of all kinds that have parts such as shafts turning inside of pilot bearings or friction surfaces running in close proximity under operating conditions.

In accordance with various aspects of the invention, means are provided to engage and disengage the coupling members.

Figure 4:
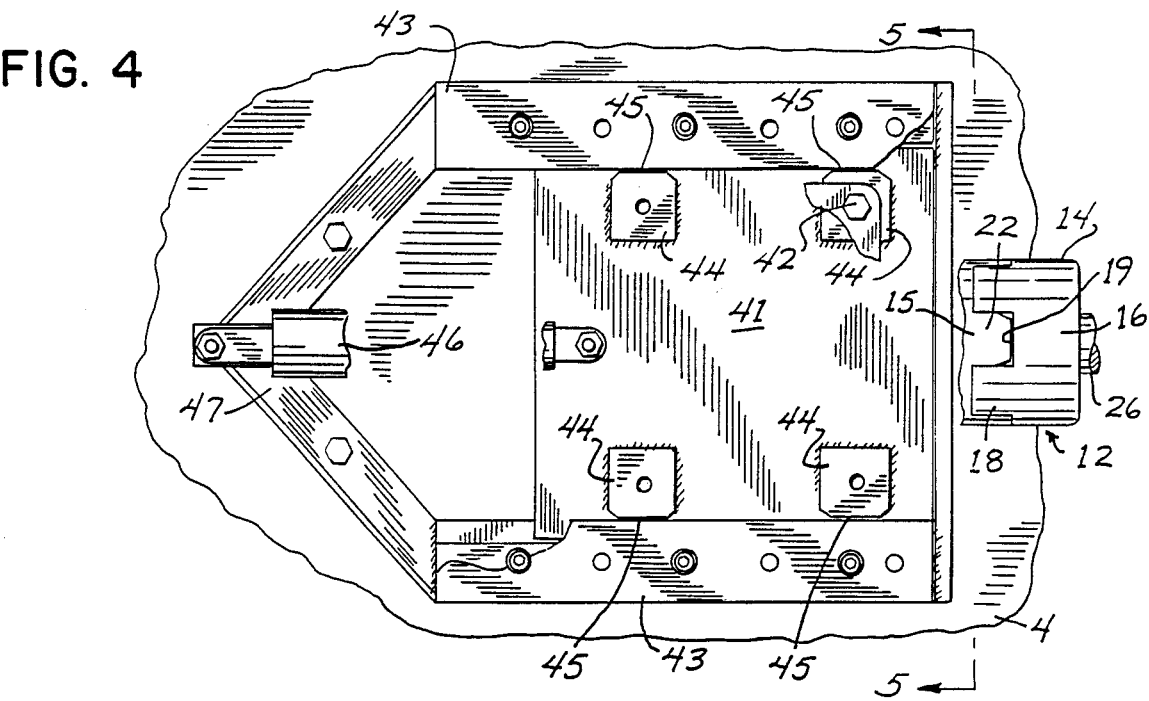
FIG. 4 is an enlarged top view, with parts broken away, of the bed for the rotor indexing drive assembly, and showing the assembly base mounted for longitudinal sliding movement thereon.
Figure 5:
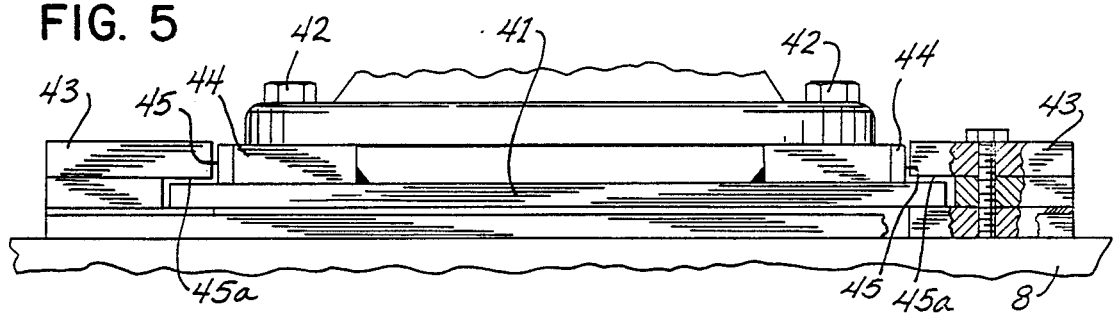
FIG. 5 is a transverse section taken on line 5—5 of FIG. 4.

In the embodiment of FIGS. 1–7, the entire rotor indexing drive assembly 7 is movable and carries the second coupling body 15 longitudinally axially into or out of the selective engagement with the first coupling body 14. For this purpose, and as best seen in FIGS. 3–5, rotor indexing drive assembly 7 is fixedly mounted on a plate-like bed 41, as by bolts 42, with bed 41 being longitudinally slidable in ways 43 secured to machine frame 8. Assembly 7 is supported by, and bolts 42 extend through, a plurality of alignment pads 44 which are secured as by welding to bed 41. Pads 44 are provided with alignment edges 45 which face the edges of the respective ways 43 and which provide special clearances to facilitate axial alignment in the horizontal plane. Spaces 45*a* facilitate axial alignment in a vertical plane.

Means are provided to slidingly extend and retract bed 41, and thus assembly 7, relative to fixed coupling body 14. For this purpose, and in the present embodiment, a linear actuator 46 is mounted to a fixed support 47 on frame 8, and is suitably connected to the sliding bed 41. Linear actuator 46 may be of any suitable type, such as an electrically operated motor-driven lead screw type (which is contemplated here), or a hydraulic cylinder or other motive drive.

FIG. 1 illustrates only one example of a control sytem 13 usable in accordance with the various aspects of the invention. The control system may be used with any of the embodiments disclosed herein, and includes an electric circuit which is connected to an electrical power source 48. Switches 49–53 provide control functions, to be described. Switches 50 and 51 are limit switches responsive to engagement by respective rod-like actuators 54,55 extending from assembly 7. Switches 49, 52 and 53 are manually actuatable from any suitable control panel.

Brake-motor assembly 9 is a well-known fail safe type wherein when motor 9*b* is energized, brake 9*a* is disengaged, the fail safe spring-set electrically released brake being of a relatively small-powered type, such as about 3 ft. lbs. However, in view of the large speed reducing and torque multiplying capabilities of speed reducer 10, the holding power of brake 9*a* can be extremely large at output shaft 11. For example, with a 3,000-to-1 or more speed reduction, the effective holding power of brake 9*a* may be as high as 15,000 ft. lbs. This may be very important in the case where removal of a series of hammers 6 on one side of rotor 5 will cause the rotor to tend to rotate due to severe rotor unbalance. A brake 9*a* of the holding power described will be able to hold rotor 5 against such rotation, when coupling 12 is engaged.

In operation, assuming that coupling 12 is disengaged (as in FIG. 6) with rotor indexing assembly 7 retracted, limit switch 51 is opened and limit switch 50 is now closed so that the circuit may be completed through mill motor 4 upon movement of switch 49 to its leftward position. Also indexing motor 9*b* is made inoperable, anytime mill motor 4 is started, because of movement of switch 49 to its leftward position. With the disengaged coupling 12 and inoperable rotor indexing assembly 7 and switch 49 manually actuated to its leftward position, mill motor 4 is energized by power source 48 to drive rotor 5 in a milling operation.

When motor 4 is turned off by manually actuating switch 49 to its rightward position, and it is desired to index rotor 5 to properly position selected hammers 6 for removal, switch 52 is manually actuated rightwardly to activate linear actuator 46 to extend to cause engagement of coupling 12, which is the position shown in FIG. 1. At this time, limit switch 51 is closed and limit switch 50 is opened. Thus, mill motor 4 is disconnected from power source 48. After this has occurred, switch 53 may be manually closed, which will actuate indexing motor 9*b* with a simultaneous automatic disengagement of brake 9*a*. This will cause the sytem to drive through speed reducer 10 and coupling 12 to very slowly index rotor 5. To maintain accurate jogging-type indexing of rotor 5, switch 53 may be of the push-button momentary or other suitable type. When switch 53 is disengaged at any time during the indexing operation, with the accompanying deactivation of indexing motor 9*b* and simultaneous and automatic engagement of brake 9*a*, the higher inertia forces of rotor 5 may cause the latter to continue to turn slightly. However, brake 9*a* will exert a very high braking force through coupling 12 and onto rotor shaft 2, as described above, such force preferably being on the order of 9,000 ft. lbs. and keeping deceleration time to a minimum. A time delay relay is incorporated in the brake circuit to allow an adjustable fraction of a second for mill coast down to prevent recoiling or rocking of massive mill rotor 5.

Once indexing and hammer removal have been completed, switch 52 is manually actuated leftwardly to retract linear actuator 46 and rotor indexing assembly 7 longitudinally, thereby disengaging coupling 12. The positions of limit switches 50 and 51 are again reversed. Switch 49 may now be manually actuated leftwardly to start up mill motor 4 again.

Figure 8:
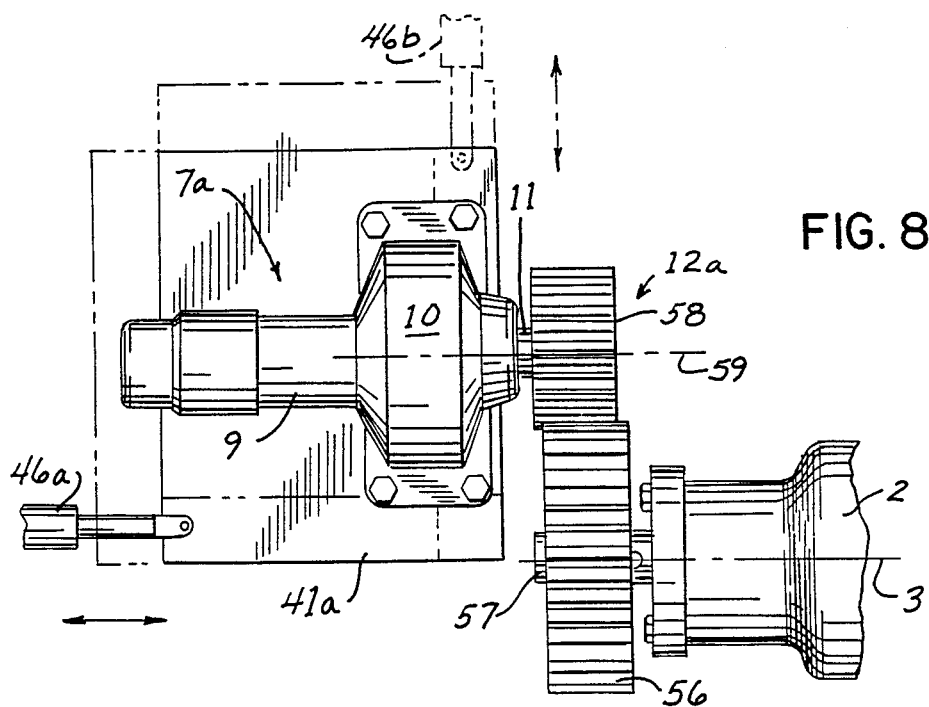
FIG. 8 is a schematic top view of a portion of additional embodiments of a rotor indexing drive assembly, with two alternate forms of coupling.

FIG. 8 schematically illustrates an alternative construction wherein coupling 12a includes a first coupling member comprising a bull gear 56 mounted on a stub shaft 57 rotatably attached to mill shaft 2 and fixed against longitudinal movement, and a second coupling member comprising a pinion gear 58 mounted to the output shaft 11 of speed reducer 10, with the latter having an input from a similar brake-motor assembly 9. The axis 3 of shaft 2 and the axis 59 of shaft 11 are parallel. FIG. 8 also illustrates two different alternatives wherein, as in the embodiment of FIGS. 1-7, bed 41a and its mounted rotor indexing drive assembly 7a is shiftable longitudinally, as by a longitudinally movable linear actuator, shown in full lines at 46a. Alternately, the construction may be such that bed 41a and assembly 7a are instead shiftable transversely by a linear actuator, shown in phantom lines at 46b. Note the related full line and phantom arrows.

Figure 10:
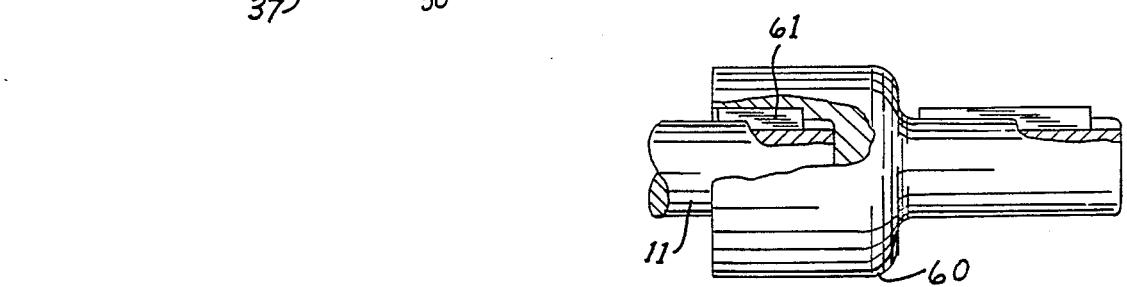
FIG. 10 is a showing of a shaft extender for mounting the outer coupling member on its shaft; and, FIG. 11 is a top plan view, similar to FIG. 9, and utilizing a different type of coupling.
Figure 9:
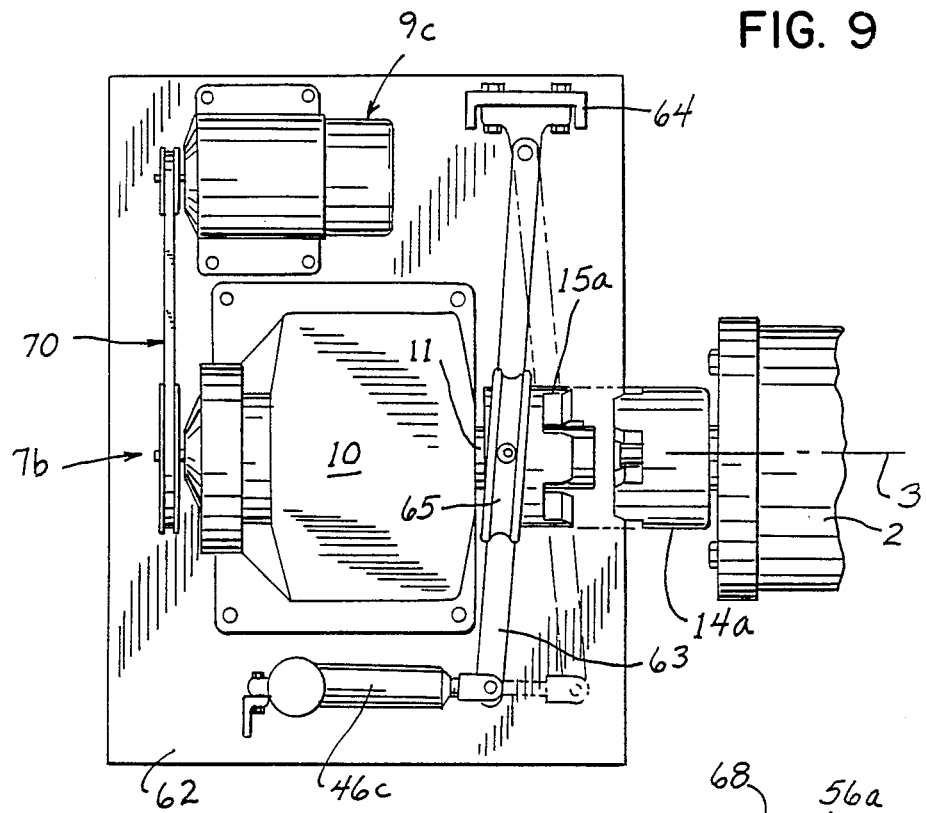
FIG. 9 is a top plan view of an embodiment wherein the rotor indexing drive assembly is fixed and the outer coupling jaw is slidable relative to the inner jaw.

In some instances, such as the situation presented in FIG. 9, speed reducer shaft 11 may not be long enough to cause proper engagement of the first and second coupling members. FIG. 10 illustrates a solution to this problem, which comprises a shaft-like extender 60 which is fixedly mounted to the end of shaft 11, as by a key 61.

Figure 11:
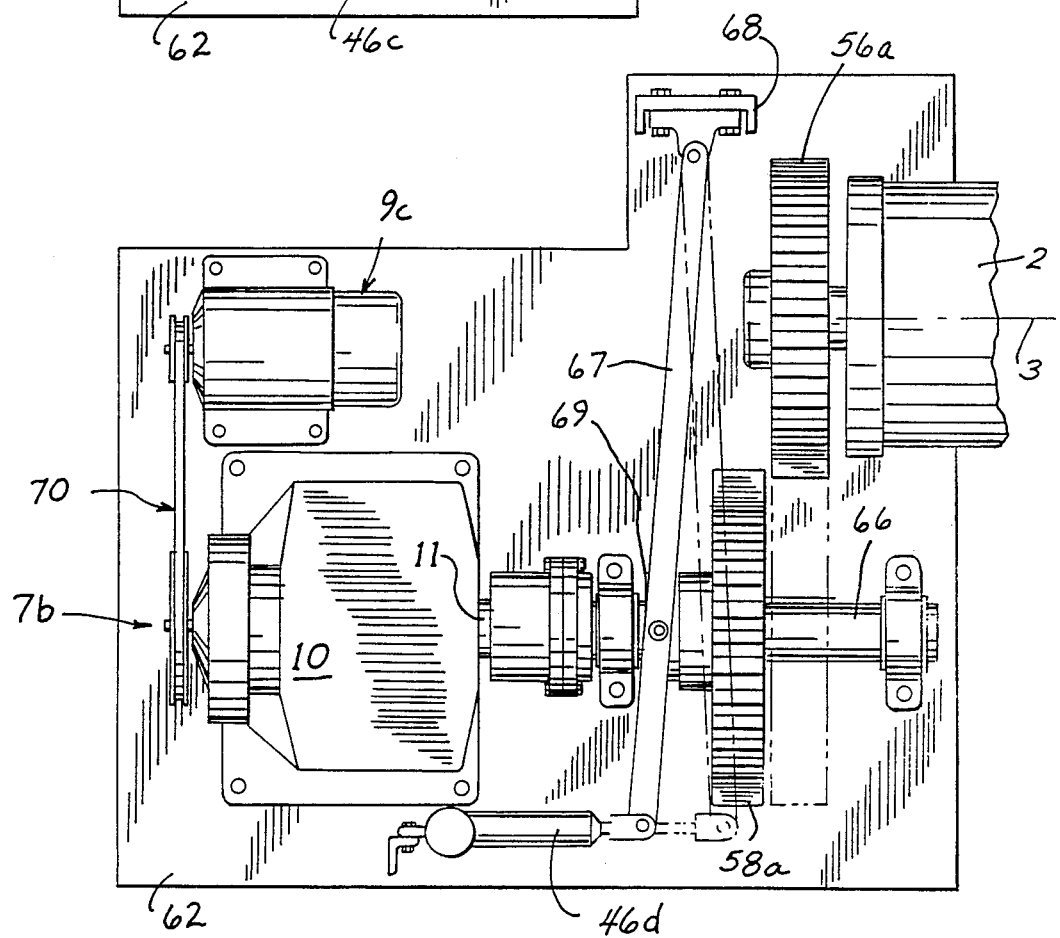

FIGS. 9 and 11 illustrate embodiments wherein, instead of shifting the rotor indexing drive assembly to shift the second coupling member into engagement with the first coupling member, the rotor indexing drive assembly 7b is mounted on a fixed bed 62 and the second coupling member is arranged to shift along or parallel to mill shaft axis 3. FIG. 9 illustrates coupling bodies 14a and 15a, similar to FIGS. 1-7, while FIG. 11 illustrates a meshing gear-type coupling similar to FIG. 8, with a bull gear 56a meshable with a pinion gear 58a.

In FIG. 9, second coupling body 15a is shifted axially longitudinally relative to first coupling body 14a. In this instance, body 15a is slidable on the output shaft 11 of speed reducer 10. A linear actuator 46c mounted on bed 62 is connected to one end of a pivotable lever 63 which is secured at its other end to bed 62, as at 64. The midportion of lever 63 is pivotally mounted to the connector assembly 65 on coupling body 15a. Actuation of linear actuator 46c causes lever 63 and connector assembly 65 to shift coupling body 15a.

In FIG. 11, pinion gear 58a is similarly shiftable on a jack shaft 66 which is coaxial with the speed reducer output 11. A linear actuator 46d mounted on bed 62 is connected to one end of a pivotable lever 67 which is secured at its other end to bed 62, as at 68. The mid-portion of lever 67 is pivotally mounted to a connector assembly 69 suitably secured to gear 58a.

In both FIGS. 9 and 11, the brake-motor assembly 9c is not coaxial with speed reducer 10, but instead is offset to one side and is connected to speed reducer 10 in any suitable manner, such as by a belt and pulley drive 70.

The various aspects of the invention are believed to provide a major improvement in the indexing of massive hammer mills and the like for maintenance and other purposes. Utilization of a relatively high speed and low torque motor connected through a speed reducer having an extremely low speed high torque output shaft connectable through a very special purpose jaw clutch to the heavy main mill shaft provides extremely improved workability in terms of time and labor savings and safety.

Various modes of carrying out the invention are contemplated as being within the scope of the following claims particularly pointing out and distinctly claiming the subject matter which is regarded as the invention.

I claim:

1. In a hammer mill or the like having a massive high inertia hammer-carrying rotor (5) and a longitudinally extending rotatable output member (2) defining an axis (3), apparatus for rotatably indexing said rotor, comprising:
    (a) a rotor indexing drive assembly (7) disposed at one end of said output member and with said drive assembly including:
        (1) a relatively high speed low torque indexing motor (9b),
        (2) a speed reducer (10) connected to said motor and with said speed reducer having a relatively low speed high torque output shaft (11),
    (b) power transmitting engageable coupling means (12,12a) disposed between said speed reducer and said output member, and with said coupling means including:
        (1) a first coupling member (14,56) fixedly and coaxially connected to the said one end of said output member,
        (2) and a second coupling member (15,58) mounted to said speed reducer output shaft and normally being spaced from and adapted for releasable engagement with said first coupling member to engage said coupling means,
    (c) a normally engaged brake (9a) connected to said motor (9b) and with said brake being automatically disengaged when said motor is energized for indexing said output member and said rotor through the engaged coupling means,
    (d) said rotor indexing drive assembly (7,7a) being fixedly mounted on a longitudinally movable bed (41,41a),
    (e) means for moving said bed so that said second coupling member (15,58) is selectively engaged with or disengaged from said first coupling member (14,56),
    (f) said first and second coupling members comprising first and second matable coupling bodies (14,15), and with each said body including an annular base and a plurality of circumferentially spaced jaws (18,22) forming longitudinally extending recesses (24,25),
    (g) alignment means to align said first and second bodies as they are caused to be engaged by said bed moving means,
    (h) said jaws (18,22) being provided with flat outer ends (34,37) which merge at each jaw side into bevelled surfaces (35,38), said bevelled surfaces merging into longitudinally extending working surfaces (36,39),
    (i) said bevelled surfaces forming said alignment means as said coupling jaws are engaged,
    (j) a pilot shaft (26) secured to said output member (2) and mounting said first coupling body (14),
    (k) said pilot shaft having a tapered terminus end (32) and entering said recess (25) of said second coupling body (15) upon engagement of said bodies, (1) and said tapered terminus end forming said alignment means as said coupling bodies are engaged to compensate for temperature caused distortion.

2. In a hammer mill having a massive high inertia hammer-carrying rotor (5) and a longitudinally extending rotatable output member (2) defining an axis (3), apparatus for rotatably indexing said rotor, comprising:
 (a) a rotor indexing drive assembly (7) disposed at one end of said output member, and with said drive assembly including:
  (1) a relatively high speed low torque indexing motor (9b),
  (2) a speed reducer (10) connected to said motor and with said speed reducer having a relatively low speed high torque output shaft (11),
 (b) power transmitting engageable coupling means (12,12a) disposed between said speed reducer and said output member, and with said coupling means including:
  (1) a first coupling member (14,56) fixedly and coaxially connected to the said one end of said output member,
  (2) and a second coupling member (15,58) mounted to said speed reducer output shaft and normally being spaced from and adapted for releasable engagement with said first coupling member to engage said coupling means,
 (c) a normally engaged brake (9a) connected to said motor (9b) and with said brake being automatically disengaged when said motor is energized for indexing said output member and said rotor through the engaged coupling means,
 (d) and means (46) for engaging and disengaging said coupling members.

3. The apparatus of claim 2:
 (a) wherein said rotor indexing drive assembly (7) is fixedly mounted on a longitudinally movable bed (41,41a),
 (b) and said means (d) includes means (46,46a) for moving said bed so that said second coupling member (15,58) is selectively engaged with or disengaged from said first coupling member (14,56).

4. The apparatus of claim 2:
 (a) wherein said rotor indexing drive assembly (7a) is fixedly mounted on a transversely movable bed (41a),
 (b) and said means (d) includes means (46b) for moving said bed transversely to adjust the position of said second coupling member (58) relative to said first coupling member (56).

5. The apparatus of claim 2:
 (a) wherein said rotor indexing drive assembly (7b) is fixedly mounted on a fixed bed (62),
 (b) and wherein said second coupling member (15a,58a) is longitudinally slidably mounted on said speed reducer output shaft (11),
 (c) and said means (d) includes means (46c,46d) for slidably shifting said second coupling member on said output shaft so that said second coupling member is selectively engaged with or disengaged from said first coupling member (14a,56a).

6. The apparatus of claim 2 in which said speed reducer provides about a 3,000 to 1 speed reduction, and said brake (9a) exerts a braking force of about 15,000 ft. lbs. to hold said massive rotor (5), when indexed, in position.

7. The apparatus of claim 2:
 (a) wherein said first and second coupling members comprise first and second matable coupling bodies (14,15), and with each body including an annular base and a plurality of circumferentially spaced jaws (18,22) forming a longitudinally extending recess (24,25),
 (b) and alignment means to align said first and second bodies as they are caused to be engaged by said coupling engaging and disengaging means (46,46c).

8. The apparatus of claim 7:
 (a) wherein said body jaws (18,22) are provided with flat outer ends (34,37) which merge at each jaw side into bevelled surfaces (35,38), said bevelled surfaces merging into longitudinally extending working surfaces (36,39),
 (b) said bevelled surfaces forming said alignment means as said coupling bodies are engaged.

9. The apparatus of claim 7:
 (a) which includes a pilot shaft (26) secured to said rotatable output member (2) and mounting said first coupling body (14),
 (b) said pilot shaft having a tapered terminus end (32) and entering said recess (25) of said second coupling body (15) upon engagement of said bodies,
 (c) said tapered terminus end forming said alignment means as said coupling bodies are engaged to compensate for temperature caused distortion.

10. The apparatus of claim 2 wherein said first and second coupling members comprise matingly engageable gears (56,58; 56a,58a).

* * * * *